United States Patent [19]

Williams et al.

[11] Patent Number: 5,635,591
[45] Date of Patent: Jun. 3, 1997

[54] PROCESS FOR MAKING HIGH VISCOSITY INK RESINS

[75] Inventors: Theodore J. Williams; Robert R. Klein, both of Panama City, Fla.

[73] Assignee: Arizona Chemical Company, Panama City, Fla.

[21] Appl. No.: 438,606

[22] Filed: May 10, 1995

[51] Int. Cl.$^6$ .................................................. C09F 1/00
[52] U.S. Cl. .................. 530/210; 530/211; 106/31.41; 106/31.73; 101/450.1; 101/463.1; 101/DIG. 43
[58] Field of Search ...................... 530/210, 211; 106/26 R, 21 C; 101/450.1, 463.1, DIG. 43

[56] References Cited

U.S. PATENT DOCUMENTS

| | | | |
|---|---|---|---|
| 2,478,490 | 8/1949 | Krumbhaar | 260/25 |
| 3,121,914 | 2/1964 | Olson et al. | 18/12 |
| 3,207,205 | 9/1965 | Briskin et al. | 159/47 |
| 3,387,073 | 6/1968 | Larsen | 264/211 |
| 3,486,864 | 12/1969 | Van Der Schee et al. | 23/285 |
| 3,642,964 | 2/1972 | Rausch, Jr. et al. | 264/40 |
| 4,189,410 | 2/1980 | Laurito | 260/23.7 |
| 4,304,601 | 12/1981 | Sharp | 106/29 |
| 4,320,048 | 3/1982 | Harmuth | 523/333 |
| 4,434,007 | 2/1984 | Lenox et al. | 106/26 |
| 4,528,036 | 7/1985 | Rudolphy | 106/30 |
| 4,597,927 | 7/1986 | Zeitler et al. | 264/85 |
| 4,693,846 | 9/1987 | Piccirilli et al. | 260/97 |
| 4,857,624 | 8/1989 | DeBlasi et al. | 528/129 |
| 4,963,188 | 10/1990 | Parker | 106/20 |
| 5,021,538 | 6/1991 | Crews | 528/129 |
| 5,208,319 | 5/1993 | Schilling | 530/210 |

OTHER PUBLICATIONS

Burke, Roger E. "Rosin-based Printing Inks", *Naval Stores*, pp. 665–700. Published before 1994.
Petrone, John P., "Synthetic Resins for Inks", *American Ink Maker*, Apr., 1971.
Thiele, William, *Twin-Screw Extruders as Reactors*, The University of Toronto pp. 1–17, Published before 1994.
Vincent, Dr. John E., "Chemistry of Aluminum-Organics in the Preparation of Ink Vehicles and Gel Varnishes", *American Ink Maker*, Oct., 1984.

*Primary Examiner*—James J. Seidleck
*Assistant Examiner*—Duc Truong
*Attorney, Agent, or Firm*—Luedeka, Neely & Graham, P.C.

[57] ABSTRACT

The specification discloses a process for making high viscosity gelled ink resins which exhibit improved properties. In a preferred embodiment, a precursor resin is conducted through an extruder with a cross-linking agent, preferably a heat reactive phenolic resin, to induce formation of covalent cross-link bonds in the resin producing a high viscosity resin which resists viscosity breakdown under high shear conditions. The resulting gelled ink resins may be used directly in making ink, obviating the need for further gelation and avoiding the use of conventional organo-metallic gelling agents.

58 Claims, No Drawings

PROCESS FOR MAKING HIGH VISCOSITY INK RESINS

The present invention relates generally to ink resins and to methods for making ink resins. More particularly, the invention relates to a process for making very high molecular weight, highly crosslinked ink resins and to the improved resins made by the process.

Conventional rosin and hydrocarbon-based resins for lithographic ink applications are prepared in stirred tank reactors. Relatively low molten viscosities and slow reaction rates are ideally suited for this type of equipment. Reaction times in the order of 24 hours or are more often required to obtain product with desirable properties. Such resins are usually highly branched and possess very broad molecular weight distributions. The product may even contain some fraction of crosslinked gelled structures, but this fraction is typically limited in quantity by virtue of the inability of a stirred tank vessel to handle the very high molten viscosity and non-Newtonian behavior that normally accompanies the presence of a gelled resin structure. Accordingly, such resins are typically gelled in a separate "gelling" reaction in solution in order to improve their rheological properties if a very highly structured material is desired.

Conventional lithographic ink vehicles may be prepared from existing resins by dissolving/dispersing the resins in lithographic ink solvents and then subjecting the mixture to the so called "gelling" reaction by means of an aluminum based gelling agent. The role of the aluminum compound in the preparation of lithographic ink vehicles has typically been that of controlling the rheological properties of the ink vehicle.

Known aluminum gelling compounds for use in preparing ink vehicles may be classified as: 1) aluminum soaps, 2) aluminum alkoxides, 3) chelated alkoxides and 4) oxyaluminum acylates. However, aluminum compounds require the generation or existence of an aluminum hydroxyl functionality to form the ultimate rheology or gel structure. Accordingly, the resulting gel structure is the result of the coordinate covalent or hydrogen bonding of the aluminum hydroxyl species.

Coordinate covalent and hydrogen bonds are relatively weak bonds, typically only about 5 to 10% as strong as covalent bonds. Under the high shear conditions associated with lithographic printing, the gel structure afforded by such bonds is substantially degraded. Some degree of thixotropic behavior is important for successful printing. However, there are limits to the degree of flow development that can be tolerated before unwanted side effects become apparent. The loss of gel structure becomes significantly more critical as the speed of the printing operation increases.

One consequence of the loss of gel structure in the ink vehicle is the tendency for excessive mist to develop. As the speed of the roller trains on the press increases applying greater and greater shear forces, there is an increased tendency for mist to occur. This tendency for misting is exacerbated by the viscosity losses resulting from the gel structure breakdown experienced at high print speeds.

Another consequence of degradation of the ink structure and viscosity resulting from excessive shear is a loss of print sharpness. When ink is sheared to the extent that flow becomes significant, the printed dot is diffused thereby yielding excessive "dot gain" or poor print quality.

An additional problem associated with the use of gelling agents is that manufacturers of ink vehicles are shifting to the use of solvents from renewable resources and solvents which provide significantly lower levels of volatile organic compounds (VOC) in the inks. Examples of such solvents are various fatty acid esters. While fatty acid ester solvents generally have greater solvation power over the resin used to prepare gelled ink vehicles, they typically do not allow for the same level of resin loading when compared to hydrotreated petroleum distillate-type solvents, which also increase the difficulty in obtaining strong gel structure with conventional resins. This increased solvency power increases the difficulty in obtaining the desired strong gel structure requiring the use of even more gellant in the production of a product with less than optimal resistance to shear induced breakdown.

Another undesirable aspect of the use of gelling agents is that such agents are typically the most expensive ingredient in the varnish formulation on a weight percent basis. The gel reaction also requires a separate reaction step thereby consuming time, energy and man-power for the production of gelled ink vehicles. Hence, the use of organo-aluminum gelling agents presents a definite economic liability.

Furthermore, the lithographic printing industry is shifting to the use of higher molecular weight/higher solution viscosity "self structuring" ink resins to improve the press performance of inks during high speed press operations. New generation web-offset lithographic printing presses are capable of achieving printing speeds up to about 3000 feet/minute. However, as stated previously, the extent of resin crosslinking achievable in stirred tank reactors is limited by the ability to stir, control and otherwise process a final product having very high melt viscosity. A reduced level of resin crosslinking typically reduces the level of solution viscosity and the degree of "self structuring" of the resin.

Because of the trend toward higher speed printing presses and the continuing need to improve the ink application process and print quality, there continues to be a need for improved resins for use as ink vehicles in the printing industry. One important goal is to develop a high viscosity resin which causes the final ink to exhibit good misting properties under the high shear turbulent printing conditions of modern high speed printing presses.

Therefore, it is an object of the present invention to provide a high viscosity ink resin and a process for making the same which avoids the shortcomings of conventional processes.

Another object of the invention is to provide high viscosity ink resins which reduce misting on high speed printing machines.

A further object of the invention is to provide high viscosity resins for use in lithographic printing ink formulations to improve the properties of formulations.

Still another object of the invention is to provide a process for making resin of the character described with readily available, relatively inexpensive materials.

An additional object of the invention is to provide a process for making resins of the character described which is cost effective and uncomplicated.

Another object of the invention is to provide a process for making high viscosity resins which enables improved control over the properties of the resins and which enables improved uniformity in the properties of large quantities of resin.

Yet another object of the invention is to provide a process for making high viscosity resins for high speed printing applications which maintain their high viscosity even under the vigorous conditions associated with high speed printing.

With regard to the forgoing and other objects, the present invention is directed to a process for making high viscosity
} ink resins. In a broad sense, the process comprises reacting a rosin- or hydrocarbon-based resin with a non-metal containing cross-linking agent selected to induce the formation of covalent cross-link bonds in a resulting cross-linked ink resin composition of substantially increased viscosity which exhibits improved stability against mechanical breakdown imposed on the material during printing operation. The resulting cross-linked resin has a substantial gel content characterized by a predominance of covalent cross-link bonds. The rosin- or hydrocarbon-based resin subjected to the cross-link reaction is referred to herein at times as the "precursor resin".

In particular, gelled ink resins produced by the method of the invention have been found to provide stable high viscosities for varnish and ink formulations containing the resin even under high shear conditions. Accordingly, resins made by the process of the invention have much improved misting characteristics because they are able to maintain their higher viscosity and elasticity properties even when subjected to severe mechanical and thermal stresses whereas commercially available resins tend to lose their viscosity and elasticity properties under such conditions.

According to an additional aspect of the invention, a process is provided for making an ink resin which comprises introducing a precursor resin selected from the group consisting of rosin- and hydrocarbon-based resins into the entrance opening of an elongated reaction chamber. The precursor resin is continuously advanced through the reaction chamber from the entrance opening toward an exit opening thereof, and is intensely mixed as it advances through the chamber with a cross-linking agent selected to induce formation of covalent cross-link bonds in the precursor resin upon application of sufficient heat energy to the mixture. The amount of cross-linking agent typically ranges from 0.5% to 10.0% by weight based on the total reaction mass weight of precursor resin and cross-linking agent. Sufficient heat energy is applied to the mixture as it is mixed and advanced through the reaction chamber to cause the formation of covalent cross-link bonds in the mixture, which is then directed from the chamber through the exit opening. The process enables the production of a cross-linked ink resin having a Gardner bubble viscosity of at least about 150 bubble seconds at 38° C.

In accordance with the invention, the Gardner bubble viscosity of the resulting resin was determined either by dissolving the resin in linseed oil or in MAGIESOL 47. For rosin-based resins, a 33.3 wt. % of resin solution in linseed oil was used for determining the Gardner bubble viscosity of the ink resin. For hydrocarbon-based resins, a 50 wt. % of resin solution in MAGIESOL 47 was used for determining the Gardner bubble viscosity.

A particularly preferred elongated reaction chamber for carrying out the method of the invention is an extruder, with a twin screw extruder being especially preferred. Reaction times in the order of only from about 30 seconds to about 15 minutes are obtained with an increase in the resin solution viscosity of up to about 1000%. The resulting highly viscous covalently cross-linked product exiting the extruder may be combined with other ingredients to form an ink varnish which may be used as a vehicle in an ink formulation for high speed printing machines, preferably lithographic printing presses.

As used herein, the term "rosin- and hydrocarbon-based resin" will be understood to include any of a number of functionalized rosin-based resins used in ink manufacturing as well as the neutral and functionalized cyclic and dicyclic unsaturated hydrocarbon resin compounds derived from hydrocarbon feeds containing from about 5 to about 15 carbon atoms which also find wide usage in ink making.

The term "rosin" as used herein will be understood to include gum rosin, wood rosin, and tall oil rosin. Rosin is derived from pine trees (chiefly *pinus palustris* and *pinus elliottii*). Gum rosin is the residue obtained after the distillation of turpentine from the oleoresin tapped from living pine trees. Wood rosin is obtained by extracting pine stumps with naphtha or other suitable solvents and distilling off the volatile fraction. Tall oil rosin is a co-product of the fractionation of tall oil which in turn is a by-product of the wood pulping process. The principle constituents of rosin are rosin acids of the abietic and pimaric types. The acids usually have the general formula $C_{19}H_{29}COOH$ with a phenanthrene nucleus. A preferred rosin for use in the present invention is tall oil rosin.

Rosin in its natural state has limited use in inks. Its main use is as a raw material for producing chemically modified rosin derivatives for various end uses. Important modified rosin and rosin derivatives used in printing ink manufacture are polymerized or dimerized rosin and their esters, metallic resinates, phenolic and/or maleic/fumaric modified rosins and their esters, and ester gums.

Important cyclic and dicyclic unsaturated hydrocarbon monomer feed streams which contain from about 5 to about 15 carbon atoms include cyclopentadiene and/or dicyclopentadiene, and their oligomers. Inexpensive commercially available DCPD concentrates typically contain from about 40 wt. % to about 90 wt. % DCPD and therefore are most preferred, although very high purity DCPD which is blended with olefinic modifier compounds may also be used.

Olefinic modifier compounds which may be used with the cyclic and dicyclic unsaturated olefins include ethylene, propylene, butadiene, styrene, alpha-methyl styrene, vinyl toluenes, indene, 1,3-pentadiene, isobutylene, isoprene, 1-butene, 1-hexene, 1-octene, limonene, alpha-pinene, beta-pinene, various acrylates and mixtures of these compounds. The olefinic modifier compound(s) is typically used in an amount ranging from about 0% to about 35% by weight based on the total weight of cyclic and dicyclic unsaturated olefin and modifier compound.

In addition to the olefinic modifiers, modification with rosin, distilled tall oil, fatty acid, dimerized fatty acid, vegetable oils, phenolic species, maleic anhydride or fumaric acid and combinations thereof are common. These species can be added before, during or after the hydrocarbon-based resin polymerization. In addition, esterification of the acid modified resins with polyols such as pentaerythritol and/or glycerine may be conducted to further modify the hydrocarbon-based resin backbone.

Any of the foregoing modified rosins, rosin derivatives and esters thereof, or cyclic and dicyclic unsaturated olefins derived and/or modified/esterified resins may be used as the "precursor" resin for the methods of the invention. The resins formed from any one or more of the foregoing are well known in the art. Higher molecular weight/higher solution viscosity resins are most preferred with solution viscosities being in the range of from about 10 to 75 bubble seconds at 38° C. These higher molecular weight/higher solution viscosity resins are typically branched but are essentially not cross-linked. With higher molecular weight resins, the amount of cross-linking agent needed to produce the gelled resins by the process of the invention is typically minimized, though the chemical characteristics of the precursor resin may affect the amount of cross-linking agent required.

A key feature of the process of the invention is the formation of covalent cross-link bonds in the ink resin in the substantial absence of a metal-containing cross-linking agent. Accordingly, the precursor resin may be formulated such that inherent reactivity is available for self-crosslinking upon input of sufficient heat energy for a sufficient period of time in the aforementioned reaction chamber or a non-metal containing cross-linking agent may be used. Without the aid of a cross-linking agent, the time required to conduct the reaction is relatively long and the final resin solution viscosity may be relatively deficient as compared to the same resin produced with the aid of a non-metal containing cross-linking agent.

Suitable non-metal containing cross-linking agents include, but are not limited to, compounds selected from the group consisting of polycarboxylic acids such as fumaric acid, maleic anhydride and dimerized fatty acid, heat-reactive phenolic compounds, polyisocyanates, epoxies, silane coupling agents and mixtures of any two or more of these. Of the foregoing, the preferred cross-linking agents are heat reactive phenolic compounds. These phenolic compounds are typically derived from phenol or any of a number of alkyl substituted phenols or combinations thereof that have been reacted under base catalyzed conditions with excess formaldehyde such that the final product is resinous in nature and has residual methylol functional groups. For example, a phenol-formaldehyde resin for use as a non-metal containing cross-linking agent may be made by reacting butyl-phenol and bisphenol-A with excess formaldehyde so that the resulting resin contains one or more reactive methylol groups.

To form covalent cross-link bonds, the amount of cross-linking agent may range from about 0.5 wt. % to about 15 wt. %, preferably from a range from about 1.0 wt % to about 5.0 wt. % and most preferably about 1.25 wt. % to about 3.0 wt. % based on the total weight of resin and cross-linking agent introduced to the reaction chamber.

The cross-linking agent may be added to the resin to form a mixture which is then fed to a reaction vessel such as an extruder, or the cross-linking agent may be fed to the reaction vessel subsequent to or essentially simultaneously with the resin. Alternatively, the resin and cross-linking agent may be combined under conditions which initiate but do not complete the cross-link reaction, and then the partially cross-linked product may be further cross-linked by mixing and heating the partially cross-linked product in the reaction vessel to a temperature in the range of from about 160° C. to about 300° C. for a period of time sufficient to essentially complete the cross-link reaction to the desired degree.

In a particularly preferred embodiment, rosin- or hydrocarbon-based resin and from about 1.5 to about 3.0 wt. % cross-linking agent are fed under "starved" conditions to an extruder having multiple zones and equipped to generate a subatmospheric pressure in at least one zone along the length of the extruder. A multiple zone twin screw extruder with counter rotating or co-rotating intermeshing screws is an especially preferred apparatus for carrying out the process of the invention. The terminology "starved" will be understood to include a feed rate of resin into the reaction chamber wherein all of the void space in the chamber is not filled with resin. The temperature of the resin fed to the reaction chamber is preferably above 200° C. and increased to about 275° C. in at least one zone of the reaction chamber, preferably in a zone which has subatmospheric pressure.

In the alternative to or in addition to operating a zone of the extruder under subatmospheric pressure, at least one zone may be provided with a purge gas, preferably an inert gas such as nitrogen, and at least on zone downstream of the purge gas zone be provided with a vent for exhaust of the purge gas and/or for application of a subatmospheric pressure. In this manner, water or by product gases may be removed or vented from the extruder as the reaction progresses.

As the precursor resin and cross-linking agent advance through the extruder they are intensively mixed in at least one mixing zone, preferably at a temperature above the softening point of both the cross-linking agent and precursor resin. It is important that the resin and cross-linking agent be thoroughly mixed while being heated. During the mixing and heating, a cross-link reaction occurs with the resin, providing covalent cross-link bonds in the resulting product.

The at least partially gelled resin preferably is advanced out of the exit opening of extruder at a temperature that is dictated by the pumping requirements of the extruder. Typically this means that the resin temperature is within the range of from about 180° C. to about 240° C. The resin emerges from the exit end of the extruder as a highly viscous ribbon, sheet or rope, depending on the die open configuration, hardens upon cooling, and may thereafter be divided into powder, chips, granules, flakes or the like. The Gardner bubble viscosity of the partially gelled resin as it emerges from the reaction chamber is generally at least about 150 bubble seconds at 38° C., which is considerably higher than that of conventional resins available for use in ink vehicles. Those of ordinary skill will readily recognize that a resin having such a viscosity may be extremely difficult to produce by conventional stirred tank process techniques.

Overall, the cross-linking reaction need not be conducted under an inert gas atmosphere, however, such an inert gas atmosphere may be beneficial for some resins and may eliminate excessive color development. Furthermore, the reaction may be conducted under atmospheric, subatmospheric or superatmospheric pressure conditions. However, use of at least one zone of a multi-zone reaction chamber under subatmospheric conditions is preferred. Pressures in the range of from about 250 mm of Hg to about 20 mm of Hg are particularly preferred. Regardless of the pressure in the reaction chamber, it is important that the reactants be maintained at a sufficiently high temperature with intense mixing for a period of time sufficient to achieve the desired level of gelation of the resin product.

It is a feature of the invention that a final heretofore unachievable high solution viscosity product may be produced in a very short time with reaction times as low as about 0.5 minutes and typically in the range of about 2 to about 5 minutes, and on a continuous basis with substantially uniform properties.

The reacted and extruded product may be mixed with a lithographic solvent such as MAGIESOL 47/470 (Magie Brothers Chemical Company/Pennzoil), linseed oil or soybean oil, typically in an amount ranging from about 10 to about 50 wt. % oil based on the total weight of the resin/solvent mixture, whereupon a gelled material is produced ready for direct addition to the final ink composition with the other ink components, i.e., pigment, wax compounds and the like.

Although the ink maker may add a gellant to the product at the time of the vehicle compounding, this would not generally be required since the product viscosity and properties would typically meet or exceed the requirements the ink-maker would be attempting to achieve by addition of the gellant. Thus, the product obviates the need for gellant addition in preparation of the final ink vehicle or ink composition, avoiding the time and expense associated with this extra step. In addition, since the target viscosity is achieved based on the known properties of the ink resin itself, there is a reduced need for gelation by the ink maker, thereby avoiding additional variations in the ink resin properties.

The invention may be further illustrated by reference to the following non-limiting examples.

EXAMPLES 1-6

Various modified rosin ester precursor resins were combined in an extruder with a heat-reactive pure phenolic resin available from Schenectady Chemical Company of Schenectady, New York under trade designation SP-134 (phenol-formaldehyde resin containing reactive methylol groups). The precursor resins are identified in Table 1. The extruder was an 18 mm diameter co-rotating, intermeshing twin screw extruder available from Leistritz Corporation of Somerville, N.J. having a feed zone, a die zone and 7 separate heating zones. The temperature of the feed zone was held at room temperature. The temperature of zone 1 was 180° C.; zones 2, 3 and 4 had a temperature of 250° C.; zone 5 had a temperature of 250° C. and a nitrogen sparge; zone 6 had a temperature of 250° C. and a nitrogen vent; zone 7 had a temperature of 225° C.; and the die zone had a temperature of 205° C. The resin and phenolic cross-linking agent were dry blended as powders and fed into the extruder as such. The screw speed was maintained at 150 RPM, providing a residence time of about 5 minutes.

Table 1 gives the properties of the products with various amounts of the cross-linking agent. The properties of the resulting resins are compared to the properties of a commercially available gelled resin (Example 6, JONREZ RP-339 available from Westvaco Chemical Division of Westvaco Paper Company of Jacksonville, Fla.)

The solution viscosity of the resin in seconds was determined by the Gardner bubble tube method, the softening point of the resin was determined according to ASTM Designation E28-67, and the final resin tolerance was determined by titrating 10 grams of a 33.3 wt. % resin solution in linseed oil with MAGIESOL 47 to a cloud point.

As illustrated in Table 1, resins made according to the process of the invention have much higher solution viscosities and generally higher final resin tolerances than does the JONREZ RP-339 resin (Example No. 6).

EXAMPLE 7

A precursor hydrocarbon-based resin derived from a DCPD concentrate, rosin, distilled tall oil and maleic anhydride was subjected to a cross-linking reaction in an extruder. The starting resin had a 50 wt. % MAGIESOL 47 solution viscosity of 12 secs. at 38° C. and 6.5 mLs. of MAGIESOL 47 tolerance. The extruder was an 18 mm diameter, 9 zoned intermeshing co-rotating twin screw machine available from Leistritz and fitted with a ribbon die. A dry powder blend of 94 wt. % hydrocarbon resin and 6 wt. % SP-134 was added to the extruder with the feed zone at ambient temperature. The reaction zones were set at 250° C. A nitrogen sparge was located in zone 6 and a atmospheric vent in zone 7 of the extruder. The die zone temperature was maintained at 210° C. The final cross-linked resin had a 194.7° C. softening point, a solution viscosity of 50 wt. % of resin in MAGIESOL 47 of 467 seconds at 38° C. and 5 mLs of MAGIESOL 47 tolerance.

EXAMPLES 8 AND 9

The cross-linked hydrocarbon-based resin of Example 7 was compared to a high molecular weight commercial hydrocarbon resin (RESINALL 523 commercially available from Resinall Corporation of Stamford, Conn.) in a lithographic varnish system. The varnish compositions are described in Table 2. The varnishes were evaluated in both a ungelled and gelled state and the results are contained in Table 3.

TABLE 1

| Example No. | Resin No. | Cross-Link Agent (wt. %) | Final Resin Acid Number | Final Resin Softening Pt. (°C.) | Final Resin Solution Viscosity[1] (sec.) | Final Resin Tolerance[2] (M47 mLs) |
|---|---|---|---|---|---|---|
| 1 | 1 | 2.00 | 19.1 | 200+ | 322 | 12 |
| 2 | 2 | 1.00 | 15.9 | 200+ | 620 | 17 |
| 3 | 3 | 2.00 | 19.2 | 200+ | 500 | 6 |
| 4 | 4 | 1.00 | 15.6 | 200+ | 489 | 60 |
| 5 | 5 | 11.75 | 14.3 | 200+ | 180 | 13 |
| Comparative 6 | — | — | 18.6 | 168 | 128 | 7 |

[1]33.3% resin in linseed oil solution. Viscosity recorded as Gardner bubble seconds at 38° C.
[2]Cloud point of 10 grams of the above solution titrated with MAGIESOL 47
Resin No. 1 - Maleic modified rosin ester resin having a softening point of 153° C., acid number of 18, solution viscosity of 22 secs., and tolerance of 20 mLs.
Resin No. 2 - Phenolic modified rosin ester resin having a softening point of 163° C., acid number of 20, solution viscosity of 75 secs., and tolerance of 25 mLs.
Resin No. 3 - Phenolic modified rosin ester having a softening point of 152° C., acid number of 20, solution viscosity of 26 secs., and tolerance of 10.5 mLs.
Resin No. 4 - Phenolic modified rosin ester resin having a softening point of 165° C., acid number of 20, solution viscosity of 48 secs., and tolerance of 200+ mLs.
Resin No. 5 - Maleic modified rosin ester having a softening point of 136° C., acid number of 17.8, and a solution viscosity of less than 5 seconds, and a tolerance of 125 mLs.

TABLE 2

| Component | Example 8 Resin of the Invention | Example 9 Comparative Sample No. 1 RESINALL 523 |
|---|---|---|
| Resin (wt. %) | 31.86 | 31.86 |
| BECKACITE 4510[3] (wt. %) | 16.99 | 16.99 |
| S-84 #3 Alkyd[4] (wt. %) | 8.49 | 8.49 |
| MAGIESOL 470 (wt. %) | 37.91 | 37.91 |
| tridecyl Alcohol (wt. %) | 2.50 | 2.50 |
| OAO[5] Solution (wt. %) | 2.25 | 2.25 |

[3]BECKACITE 4510 - a resin commercially available from Arizona Chemical Company of Panama City, Florida.
[4]S-84 - a #3 alkyd compound available from Bergvik Kemi AB of Sandarne, Sweden.
[5]OAO - 50 wt. % oxyaluminum octoate in MAGIESOL 47.

TABLE 3

| Properties | Example 8 Resin of Invention | | Example 9 Comparative Sample No. 1 (RESINALL 523) | |
|---|---|---|---|---|
| | Before OAO Gellant Rx | After OAO Gellant Rx | Before OAO Gellant Rx | After OAO Gellant Rx |
| Viscosity (poise) | 246.0 | 373.0 | 108.0 | 166.0 |
| Yield Value (dynes/cm2) | 3016.0 | 11776.0 | 663.0 | 2165.0 |
| Shortness Ratio[6] | 12.3 | 31.6 | 6.1 | 13.0 |
| M47 Tolerance (mLs) | 5.0 | 13.5 | 10.5 | 14.0 |

[6]Shortness Ratio = Yield Value/Viscosity (measurement of gel structure)

As illustrated by the foregoing Examples 8 and 9, the cross-linked hydrocarbon-based resin of the invention affords significantly higher viscosity and elasticity (Yield Value) both before and after a further gelling reaction than does the Comparative Sample No. 1 of Example 9. Likewise, the shortness ratios of the varnish made with the resin of the invention are significantly higher than the corresponding shortness ratios of the varnish of Example 9.

EXAMPLES 10, 11 AND 12

To demonstrate the latitude with respect to generating resin under various reaction conditions, a maleic modified rosin ester was reacted with SP-134 under various reaction conditions. The precursor maleic modified rosin ester had an acid number of 18.7, a softening point of 154° C. and a solution viscosity (33.3 wt. % resin in linseed oil) of 18 seconds at 38° C. The extruder was a 40 mm diameter co-rotating twin screw machine available for Werner-Pfleiderer Corporation. The solid non-metal containing cross-linking resin was fed into zone 1 at essentially room temperature. Molten precursor resin was fed into zone 2 which was held at a temperature of 250° C. A series of 8 additional heating zones held at a reaction temperature of 275° C., including zones 6 and 10 having subatmospheric pressures of about 100 mm of Hg, were used to conduct the reaction. The last four zones were held at a temperature of 200° C. The resin exited the machine through a bottom discharge orifice. Results of the runs are given in Table 4.

TABLE 4

| Example No. | Precursor Feed Temp. (°C.) | Reaction Temp. (°C.) | Screw RPM | Through-Put Rate (lbs/hr) | Cross-linker Content (wt. %) | Solution Viscosity (33.3 wt. %) (secs.) |
|---|---|---|---|---|---|---|
| 10 | 270 | 275 | 450 | 257 | 2.75 | 399 |
| 11 | 250 | 275 | 450 | 258 | 2.90 | 444 |
| 12 | 225 | 275 | 400 | 206 | 2.90 | 432 |

Examples 10–12 demonstrate that the resin may be added in a molten state to an extruder being operated over a range of feed temperatures and throughput rates while still achieving a desired high final resin viscosity. Comparing Examples 10 and 11 indicates that increasing the cross-linking agent from 2.75 wt. % to 2.90 wt. % achieves an approximately 10% increase in viscosity, even when the feed temperature is dropped from 270° C. to 250° C. The addition of molten resin also allows for faster throughput rates because of the elimination of the time spent melting the resin and bringing the precursor resin/crosslinking agent mixture up to reaction temperature.

EXAMPLES 13–17

A series of pure phenolic resins were used to cross-link a maleic modified rosin ester. The precursor resin was a maleic modified rosin ester as described in Example No. 1 (Table 1). The extruder was an 18 mm diameter co-rotating twin-screw extruder with the operating conditions similar to the conditions used for preparing Examples Nos. 1–5 (Table 1) with the exception of reaction temperature. The results are given in Table 5.

TABLE 5

| Example No. | Crosslinker Type (Schenectady Designation) | Crosslinker (wt. %) | Methylol Content (wt. % of crosslinking agent) | Reaction Temperature (°C.) | Final Resin Solution Viscosity (secs.) |
| --- | --- | --- | --- | --- | --- |
| 13 | HRJ-10518 | 5.0 | 7.5 | 250 | 195 |
| 14 | SP-1045 | 3.0 | 9.3 | 275 | 183 |
| 15 | SP-103 | 3.5 | 9.7 | 250 | 165 |
| 16 | HRJ-1367 | 2.25 | 15.2 | 250 | 180 |
| 17 | SP-134 | 2.25 | 14.9 | 235 | 344 |

As illustrated by Table 5, phenolic resin containing a multifunctional bisphenol-A (SP-134) yields the highest viscosity and lowest solubility by virtue of its non-linear structure. The reactivity of the cross-linking agent appears to be a function of its methylol functionality content. A cross-linking agent having a higher methylol content therefore translates into less cross-linking agent needed to achieve the desired final resin solution viscosity.

EXAMPLES 18–20

Ink varnish formulations were made with a high viscosity resin (Example No. 1 of Table 1) and, for comparative purposes, with a commercially available conventional resin (Comparative Sample No. 2) and a self gelling resin (Comparative Sample No. 3). The varnish formulations are given in Table 6 and the properties of the ink varnish are given in Table 7.

TABLE 6

| Components | Example 18 Resin of the Invention (wt. %) | Example 19 Comparative Sample No. 2 (wt. %) | Example 20 Comparative Sample No. 3 (wt. %) |
| --- | --- | --- | --- |
| Resin (Example No. 1) | 39.0 | — | — |
| BECKACITE 6000[7] | — | 38.7 | — |
| JONREZ RP-339 | — | — | 39.0 |
| S-84 #3 Alkyd | 15.0 | 14.9 | 15.0 |
| MAGIESOL 470 | 41.0 | 39.7 | 38.4 |
| tridecyl alcohol | 5.0 | 4.8 | 7.6 |
| OAO solution[8] | — | 2.0 | — |

[7]BECKACITE 6000 - a resin commercially available from Arizona Chemical Company of Panama City, Florida.
[8]OAO solution - 50 wt. % oxyaluminum octoate in MAGIESOL 47.

TABLE 7

| Properties | Example 18 Resin of the Invention | Example 19 Comparative Sample No. 2 | Example 20 Comparative Sample No. 3 |
| --- | --- | --- | --- |
| Laray Viscosity (poise) | 169 | 144 | 96 |
| Yield Value (dynes/cm$^2$) | 4996 | 3402 | 1810 |
| Shortness Ratio (Yield Value/ Viscosity) | 29.6 | 23.6 | 18.9 |
| MAGIESOL 47 TOL. | 6.5 | 6.5 | 6.5 |

As demonstrated by the yield values and shortness ratios, the resin of the invention enables production of an ink varnish (Example 18) which is much more "structured" than that achievable with existing commercially available "self structuring resins" (Example 20). Also, the addition of gellant and a subsequent gel reaction must be performed on the conventional resin (Example 19) to approach the results afforded by the resin of the invention.

An ink formulation was made using the ink varnish formulations of Examples 18, 19 and 20. The varnish formulations are given in Table 8 and the performance properties of the ink formulation are give in Table 9.

TABLE 8

| Components | Example 18 Varnish of Invention (grams) | Example 19 Comparative Sample No. 2 (grams) | Example 20 Comparative Sample No. 3 (grams) |
| --- | --- | --- | --- |
| Varnish (made from Example No. 1 Resin) | 12.75 | — | — |
| BECKACITE 6000 Varnish | — | 12.75 | — |
| JONREZ RP-339 Varnish | — | — | 12.75 |
| Blue Flush[9] | 9.75 | 9.75 | 9.75 |
| Wax Compound[10] | 1.25 | 1.25 | 1.25 |
| MAGIESOL 47 (tack adjustment) | 0.75 | 0.50 | 0.40 |

[9]Blue Flush - phthalocyanine G.S. heatset flush.
[10]Wax compound - heatset wax dispersion

TABLE 9

| Properties | Example 18 Varnish of Invention | Example 19 Comparative Sample No. 2 | Example 20 Comparative Sample No. 3 |
| --- | --- | --- | --- |
| Average Gloss[11] (at 60° angle) | 46.40 | 46.0 | 46.4 |
| Print Density[12] | 2.34 | 2.36 | 2.38 |
| Misting[13] | 2 | 3 | 4 |
| Tack[14] | 12.0 | 12.0 | 12.0 |

[11]Measured with Micro-tri-gloss Meter - BYK from Gardener, Inc. of Silver Springs, Maryland.
[12]Measured with COSAR SOS 40 densitometer from Cosar Corporation of Dallas, Texas.
[13]Determined with inkometer at 1200 rpm and 32° C. (0 = no misting, 10 = severe misting).
[14]Measured with Thwing Albert electronic inkometer at 1200 rpm and 32° C.

As illustrated in Table 9, an ink formulation containing a resin made according to the process of the present invention (Example 18) exhibits comparable gloss, print density and tack but with lower misting properties when compared to ink formulations made with the convention resin and commercial self gelling resin (Examples 19 and 20). Thus, an ink resin made by the invention enables improved ink composition properties in terms of misting, which is believed to be a reflection of the stronger gel structure of the resin associated with the covalent crosslink bonds in the resin.

EXAMPLE 21

Preparation of a Reactive Rosin Based Resin

One thousand grams of tall oil rosin were introduced into a 1 gallon Parr Autoclave reactor and melted by heating to 160° C. under a nitrogen blanket. Magnesium oxide (1.0 grams) and 76 grams of bisphenol-A were then added to the melted rosin under nitrogen blanket and conditions of agitation, and the temperature of the reactor reduced to 120° C. After the content of the reactor reached 120° C., 55 grams of paraformaldehyde were mixed in. The reactor was sealed, and the reaction mass was then heated to 140° C. and held at this temperature for 3 hours for pressure reaction at a pressure of about 57 psig (393 kPa).

The reaction mass was then discharged into a three neck round-bottom glass flask and remelted by heating to the 190° C. Maleic anhydride (30.0 grams) was then added to the remelted mass and the temperature of the reactor held at 190° C. for one hour. After the one hour period, 120 grams of glycerine were then added to the reactor and the temperature of the reactor elevated to 260° C. and held at this temperature until the acid number of the reaction had dropped to approximately 40 to 35 (ASTM D465-59). The reaction mass was then discharged and allowed to cool to room temperature. The cooled mass was crushed to a powder and was observed to have the following properties:

| Acid Number | 34.1 |
|---|---|
| Softening Point | 144.5° C. |
| Gardner Bubble Viscosity at 38° C. (33.3 wt. % Resin in Linseed Oil) | 10 seconds |

SELF CROSS-LINK REACTION

A resin prepared as above was fed under starved feed conditions into a four stage conical co-rotating twin screw extruder (15-30 series extruder available from C. W. Brabender Instruments, Inc. of South Hackensack, N.J.), having a screw speed of 5 RPM. The first stage (feed) of the extruder was maintained at a temperature of about 140° C., the second stage of the extruder was maintained at a temperature of about 275° C. and a pressure of about 100 mm of Hg, the third stage was maintained at a temperature of about 240° C., and the fourth stage (die) of the extruder was maintained at a temperature of about 140° C. The product was recovered upon exiting the extruder and was observed to have a Gardner bubble viscosity of 100 bubble seconds for a 33.3 wt. % solution in linseed oil.

EXAMPLE 22

A phenolic modified rosin ester precursor resin, resin Example No. 2 (Table 1), was combined in an extruder with 1.0 wt. % maleic anhydride. The extruder was an 18 mm diameter co-rotating, intermeshing twin screw extruder available from Leistritz Corporation of Somerville, N.J. having a feed zone, a die zone and 7 separate heating zones. The temperature of the feed zone is held at ambient. The temperature of zone 1 was 180° C.; zone 2 was held at 235° C., zones 3, 4, 5 and 6 had a temperature of 255° C.; zone 5 had a nitrogen sparge; zone 6 had a nitrogen vent; zone 7 had a temperature of 235° C.; and the die zone had a temperature of 225° C. The resin and maleic anhydride cross-linking agent were dry blended as powders and fed into the extruder as such. The screw speed was maintained at 20 RPM, providing a residence time of about 15 minutes. The resultant resin had an acid number of 25.2, softening point of 194.5° C., a solution viscosity of 120 seconds (33.3 wt. % resin in linseed oil) and a MAGIESOL 47 tolerance of 18 mLs.

The foregoing description of certain embodiments of the present invention has been provided for purposes of illustration only, and it is understood that numerous modifications and alterations may be made without departing from the spirit and scope of the invention as defined in the following claims. The embodiments described herein are the best mode known to applicant for practicing the invention, but it will be understood that other ways of producing high viscosity ink resins according to the claims are encompassed by the invention.

What is claimed is:

1. A process for making a high viscosity ink resin which comprises:

introducing a precursor resin selected from the group consisting of rosin- and hydrocarbon-based resins into the entrance opening of an elongate reaction chamber;

advancing the precursor resin through the reaction chamber from the entrance opening toward an exit opening thereof;

continuously mixing the precursor resin as it is advanced through the reaction chamber with a non-metal containing cross-linking agent selected to induce formation of covalent cross-link bonds in the resin upon the application of sufficient energy to the mixture;

heating the mixture as it is mixed and advanced through the reaction chamber at a temperature and for a period of time sufficient to cause the formation of covalent cross-link bonds in the mixture and to provide a substantially stable high viscosity ink resin; and conducting the ink resin from the exit opening of the reaction chamber.

2. The process of claim 1 wherein at least a portion of the reaction chamber is maintained under subatmospheric pressure conditions.

3. The process of claim 1 further comprising removing water from the reaction chamber essentially as it is formed.

4. The process of claim 1 wherein the precursor resin is a rosin-based resin comprised of an ester of modified rosin.

5. The process of claim 1 wherein the precursor resin is a rosin-based resin comprised of a maleic modified rosin ester resin having a softening point of about 153° C., an acid number of about 18, a solution viscosity of about 22 seconds, and a tolerance of 10 mLs.

6. The process of claim 1 wherein the precursor resin is a rosin-based resin comprised of a phenolic modified rosin ester resin having a softening point ranging from about 150° to about 170° C., an acid number of about 20, a solution viscosity ranging from about 20 to about 80 secs, and a tolerance ranging from about 8 to greater than about 200 mLs.

7. The process of claim 1 wherein the precursor resin is a hydrocarbon-based resin comprised of a functionalized cyclic or dicyclic unsaturated hydrocarbon resin derived from a hydrocarbon feed containing from about 5 to about 15 carbon atoms.

8. The process of claim 1 wherein the cross-linking agent is a phenol-formaldehyde resin containing one or more reactive methylol groups.

9. The process of claim 1 wherein the cross-linking agent is derived from butyl phenol-bisphenol-A.

10. The process of claim 1 wherein the temperature ranges from about 150° to about 280° C.

11. The process of claim 1, wherein the precursor resin/ cross-linking agent mixture occupies a volume which is less than the volume of the void space of the reaction chamber.

12. The process of claim 1 wherein the amount of cross linking agent ranges from about 0.5 to about 15 wt. % based on the total reaction mass weight.

13. The process of claim 1 wherein the ink resin exiting the reaction chamber has a Gardner bubble viscosity of at least about 150 bubble seconds at 38° C.

14. A gelled resin made by the process of claim 1.

15. A process for making a gelled ink resin which comprises:

introducing a modified rosin-based resin into the entrance opening of an elongate reaction chamber having at least one mixing zone and at least one heating zone;

advancing the resin through the mixing and heating zones of the reaction chamber from the entrance opening toward an exit opening thereof;

continuously mixing the resin with a non-metal containing cross-linking agent in the mixing zone of the reaction chamber wherein the cross-linking agent is selected to induce formation of covalent cross-link bonds in the resin upon the application of sufficient energy to the resin/cross-linking agent mixture as the mixture is advanced through the reaction chamber;

heating the mixture in the heating zone of the reaction chamber as the mixture is mixed and advanced through the reaction chamber at a temperature and for a period of time sufficient to cause the formation of covalent cross-link bonds in the mixture and to provide an at least partially gelled ink resin in the reaction chamber of substantially increased viscosity in relation to the resin initially introduced into the reaction chamber; and conducting the gelled resin from the exit opening of the reaction chamber, wherein the amount of cross-linking agent ranges from about 0.5 to about 15 wt. % based on the total reaction mass weight and wherein the resulting ink resin has a Gardner bubble viscosity of from about 180 to about 650 bubble seconds in about a 33.3 wt. % solution of resin in linseed oil at about 38° C.

16. The process of claim 15 wherein the reaction chamber further contains at least one water removal zone.

17. The process of claim 16 further comprising removing water from the reaction chamber in the water removal zone essentially as it is formed.

18. The process of claim 15 wherein the reaction chamber further contains at least one sparging zone and at least one venting zone for sparging the mixture with an inert gas as the mixture is advanced through the reaction chamber and for venting the sparge gas from the reaction chamber.

19. The process of claim 15 wherein at least a portion of the reaction chamber is maintained under subatmospheric pressure conditions.

20. The process of claim 15 wherein the modified rosin-based resin comprises a partial ester of a modified rosin.

21. The process of claim 15 wherein the modified rosin-based resin comprises a maleic modified rosin ester resin having a softening point of about 153° C., an acid number of about 18, a solution viscosity of about 22 Gardner bubble seconds, and a tolerance of 10 mLs.

22. The process of claim 15 wherein the modified rosin-based resin comprises a phenolic modified rosin ester resin having a softening point ranging from about 150° to about 170° C., an acid number of about 20, a solution viscosity ranging from about 20 to about 80 Gardner bubble secs, and a tolerance ranging from about 8 to greater than about 200 mLs.

23. The process of claim 15 wherein the cross-linking agent is a heat reactive phenolic resin.

24. The method of claim 15 wherein the cross-link agent is a phenol-formaldehyde resin containing one or more reactive methylol groups.

25. The process of claim 15 wherein the temperature of the heating zone ranges from about 150° to about 280° C.

26. The process of claim 15 wherein the resin/cross-linking agent mixture occupies a volume which is less than the volume of the void space of the reaction chamber.

27. An ink varnish composition comprising from about 20 to about 60 wt. % of the gelled resin of claim 15.

28. A method for making a gelled ink varnish resin which comprises reacting a precursor resin selected from the group consisting of rosin- and hydrocarbon-based resins with a non-metallic cross-linking agent to provide an at least partially gelled resin whereby the partially gelled resin has a Gardner bubble viscosity of at least about 130 bubble seconds at about 38° C.

29. The method of claim 28 further comprising removing water from the reaction chamber during the polymerization reaction.

30. The method of claim 28 wherein at least a portion of the reaction chamber is maintained under subatmospheric pressure conditions.

31. The method of claim 28 wherein the precursor resin comprises an ester of a modified rosin.

32. The method of claim 28 wherein the precursor resin comprises a maleic modified rosin ester resin having a softening point of about 153° C., an acid number of about 18, a solution viscosity of about 22 seconds, and a tolerance of 10 mls.

33. The process of claim 28 wherein the precursor resin comprises a phenolic modified rosin ester resin having a softening point ranging from about 150° to about 170° C., an acid number of about 20, a solution viscosity ranging from about 20 to about 80 secs, and a tolerance ranging from about 8 to greater than about 200 mLs.

34. The method of claim 28 wherein the cross-linking agent is a heat reactive phenolic resin.

35. The method of claim 28 wherein the reaction is conducted at a temperature within the range of from about 150° to about 280° C.

36. An ink varnish composition comprising from about 20 to about 60 wt. % of the gelled resin of any one of claim 28.

37. A process for making a high viscosity ink resin which comprises:

introducing a hydrocarbon-based resin into the entrance opening of an elongate reaction chamber;

advancing the resin through the reaction chamber from the entrance opening toward an exit opening thereof;

continuously mixing the resin as it is advanced through the reaction chamber with a non-metal containing cross-linking agent selected to induce formation of covalent cross-link bonds in the resin upon the application of sufficient energy to the mixture;

heating the mixture as it is mixed and advanced through the reaction chamber at a temperature and for a period of time sufficient to cause the formation of covalent cross-link bonds in the mixture and to provide a substantially stable high viscosity ink resin; and conducting the ink resin from the exit opening of the reaction chamber.

38. The process of claim 37 wherein at least a portion of the reaction chamber is maintained under subatmospheric pressure conditions.

39. The process of claim 37 further comprising removing water from the reaction chamber essentially as it is formed.

40. The process of claim 37 wherein the hydrocarbon-based resin is comprised of a functionalized cyclic or dicyclic unsaturated hydrocarbon resin derived from a hydrocarbon feed containing from about 5 to about 15 carbon atoms.

41. The process of claim 37 wherein the cross-linking agent is a heat reactive phenolic resin.

42. The process of claim 37 wherein the cross-linking agent is phenol-formaldehyde resin containing one or more reactive methylol groups.

43. The process of claim 37 wherein the temperature ranges from about 150° to about 280° C.

44. The process of claim 37, wherein the resin/cross-linking agent mixture occupies a volume which is less than the volume of the void space of the reaction chamber.

45. The process of claim 37 wherein the amount of cross linking agent ranges from about 0.5 to about 15 wt. % based on the total reaction mass weight.

46. The process of claim 37 wherein the ink resin exiting the reaction chamber has a Gardner bubble viscosity of at least about 150 bubble seconds for a 50 wt. % of resin solution in MAGIESOL 47 at 38° C.

47. A high viscosity ink resin made by the process of claim 37.

48. A process for making a high viscosity ink resin comprising:

introducing a reactive precursor resin selected from the group consisting of reactive rosin- and hydrocarbon-based resins into the entrance opening of an elongate reaction chamber;

advancing the reactive precursor resin through the reaction chamber from the entrance opening toward an exit opening thereof;

heating the reactive precursor resin as it is advanced through the reaction chamber at a temperature and for a period of time sufficient to cause the formation of covalent cross-link bonds in the resin and to provide a substantially stable high viscosity ink resin; and conducting the ink resin from the exit opening of the reaction chamber.

49. The process of claim 48 further comprising preparing the reactive precursor resin by fuctionalizing a material selected from the group consisting of rosin, rosin esters, cyclopentadiene, dicyclopentadiene, and the like so that inherent reactivity is available in the precursor resin for cross-linking upon the input of sufficient heat energy for a sufficient period of time.

50. The process of claim 48 further comprising preparing the reactive precursor resin by blending a material selected from the group consisting of rosin, rosin esters, cyclopentadiene, dicyclopentadiene, and the like with a non-metal cross-linking agent prior to introducing the reactive precursor material into the entrance opening of the elongate reaction chamber.

51. The process of claim 50 wherein the cross-linking agent is blended with the precursor resin in an amount ranging from about 0.5 to about 15 wt. % based on the total reaction mass weight.

52. The process of claim 50 wherein the non-metal cross-linking agent is a heat reactive phenolic resin.

53. The process of claim 52 wherein the cross-linking agent is a phenol-formaldehyde resin containing one or more reactive methylol groups.

54. The process of claim 48 wherein at least a portion of the reaction chamber is maintained under subatmospheric pressure conditions.

55. The process of claim 48 wherein the temperature ranges from about 150° to about 280° C.

56. The process of claim 48, wherein the reactive precursor resin occupies a volume which is less than the volume of the void space of the reaction chamber.

57. The process of claim 48 wherein the ink resin exiting the reaction chamber has a Gardner bubble viscosity of at least about 150 bubble seconds at 38° C.

58. A high viscosity ink resin made by the process of claim 48.

* * * * *